United States Patent [19]

Summers

[11] Patent Number: 4,549,144
[45] Date of Patent: Oct. 22, 1985

[54] REFLEX RING LASER AMPLIFIER SYSTEM

[75] Inventor: Mark A. Summers, Livermore, Calif.

[73] Assignee: The United States of America as represented by the United States Department of Energy, Washington, D.C.

[21] Appl. No.: 528,285

[22] Filed: Aug. 31, 1983

[51] Int. Cl.[4] .................. H01S 3/081; H01S 3/083
[52] U.S. Cl. ........................................ 330/4.3; 372/94
[58] Field of Search ............ 330/4.3; 372/92-95, 372/98, 99, 103, 107, 108, 98.9; 356/350

[56] References Cited

U.S. PATENT DOCUMENTS

| | | | |
|---|---|---|---|
| 3,508,166 | 4/1970 | Simmons et al. | 331/94.5 |
| 3,753,147 | 8/1973 | Schulthess | 331/94.5 |
| 3,824,487 | 7/1974 | Buczek et al. | 331/94.5 |
| 3,873,942 | 3/1975 | Reilly | 331/94.5 |
| 3,942,127 | 3/1976 | Flohr et al. | 330/4.3 |
| 4,001,705 | 1/1977 | Sinclair et al. | 330/4.3 |
| 4,011,523 | 3/1977 | Mansell et al. | 331/94.5 |
| 4,079,340 | 3/1978 | Werner et al. | 331/94.5 |
| 4,126,381 | 11/1978 | Chodzko et al. | 350/294 |
| 4,135,787 | 1/1979 | McLafferty | 350/294 |
| 4,190,814 | 2/1980 | Van Workum | 331/94.5 |
| 4,239,341 | 12/1980 | Carson, III et al. | 350/294 |
| 4,267,524 | 5/1981 | Paxton et al. | 331/94.5 |
| 4,320,359 | 3/1982 | Peterson et al. | 372/18 |

OTHER PUBLICATIONS

Lawrence Livermore National Lab. Report UCR-L-50021-77, *Laser Program Annual Report*-1977, vol. 1, pp. 2-222 to 2-235.

*Primary Examiner*—S. C. Buczinski
*Assistant Examiner*—Burton J. Carniol
*Attorney, Agent, or Firm*—Henry P. Sartorio; Clifton E. Clouse, Jr.; Judson R. Hightower

[57] ABSTRACT

A laser pulse is injected into an unstable ring resonator-amplifier structure. Inside this resonator the laser pulse is amplified, spatially filtered and magnified. The laser pulse is recirculated in the resonator, being amplified, filtered and magnified on each pass. The magnification is chosen so that the beam passes through the amplifier in concentric non-overlapping regions similar to a single pass MOPA. After a number of passes around the ring resonator the laser pulse is spatially large enough to exit the ring resonator system by passing around an output mirror.

22 Claims, 13 Drawing Figures

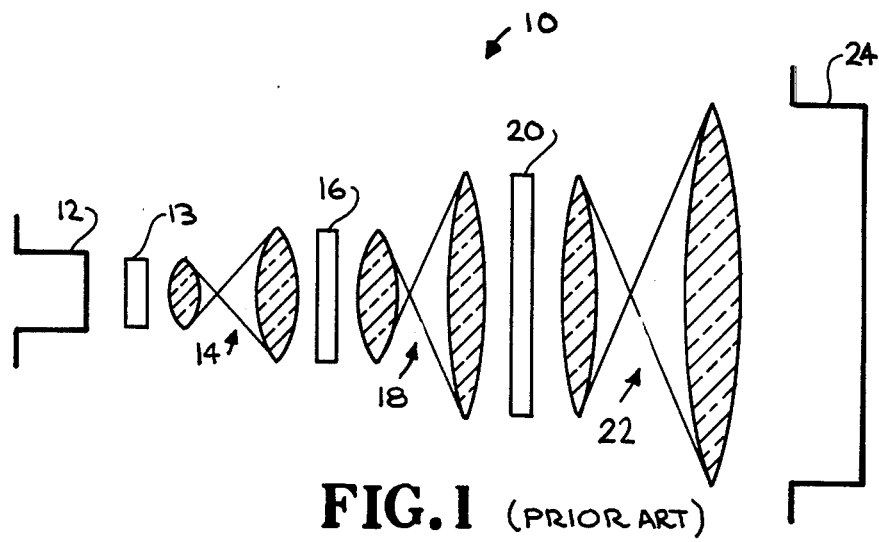
FIG. 1 (PRIOR ART)
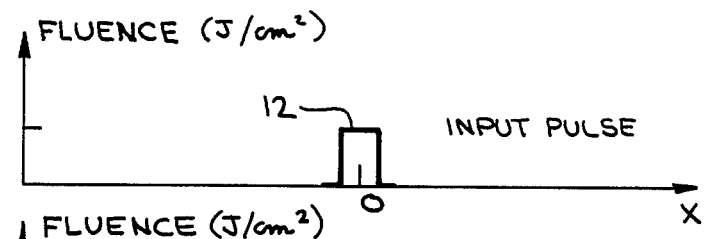
FIG. 2 (a) (PRIOR ART)
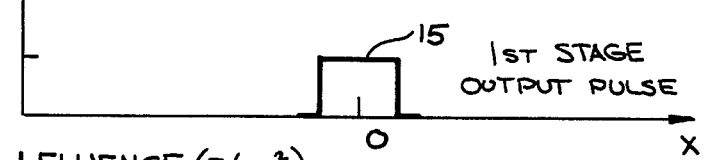
FIG. 2 (b) (PRIOR ART)
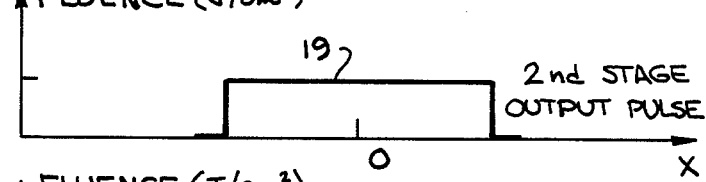
FIG. 2 (c) (PRIOR ART)
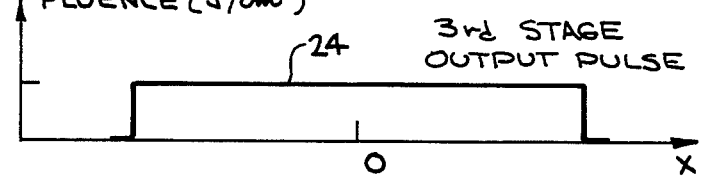
FIG. 2 (d) (PRIOR ART)

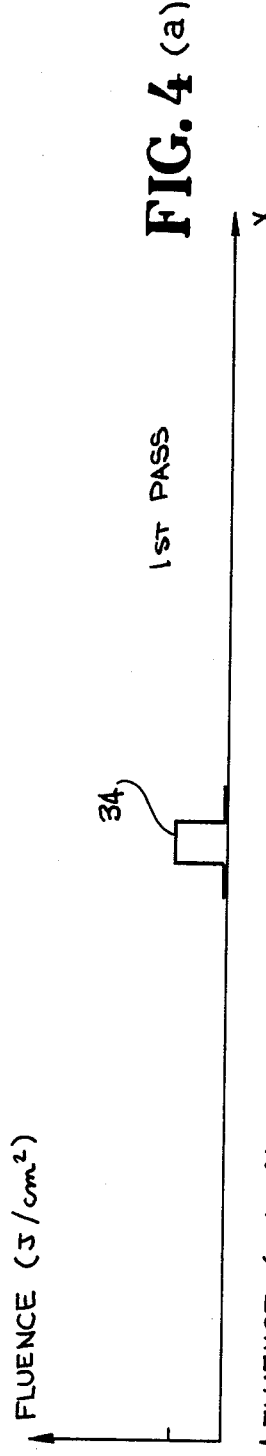
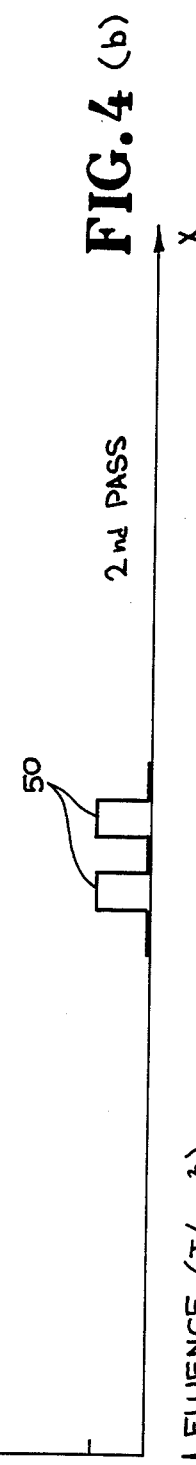
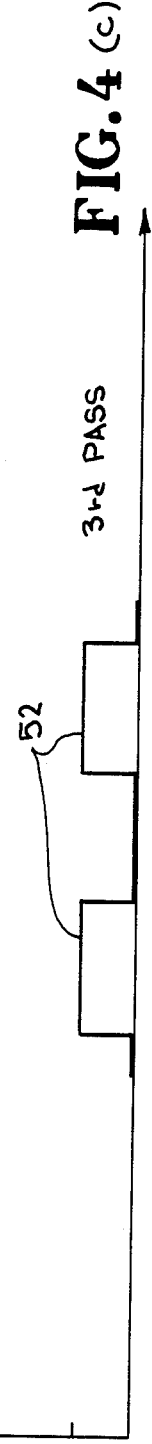
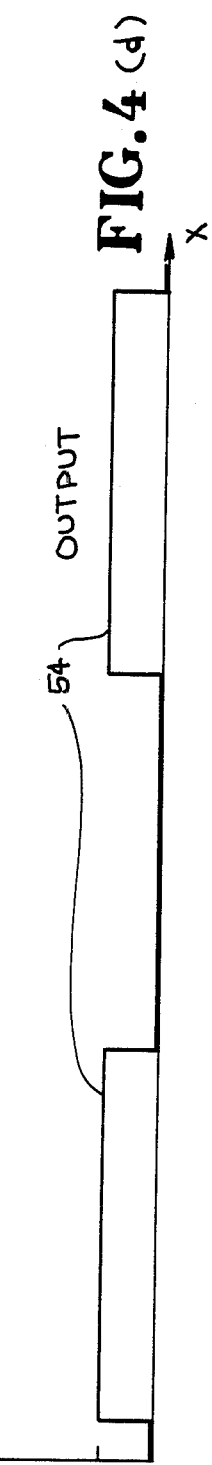
FIG. 4(a) 1st PASS
FIG. 4(b) 2nd PASS
FIG. 4(c) 3rd PASS
FIG. 4(d) OUTPUT

REFLEX RING LASER AMPLIFIER SYSTEM

The U.S. Government has rights in this invention pursuant to Contract No. W-7405-ENG-48 between the U.S. Department of Energy and the University of California, for the operation of Lawrence Livermore National Laboratory.

This invention relates to high power laser systems and, more particularly, to master-oscillator power amplifier (MOPA) architectures.

BACKGROUND OF THE INVENTION

The use of long chains of cascaded amplifiers and spatial filters for laser systems is well known. This system architecture, commonly known as a master-oscillator power amplifier (MOPA), is well characterized and widely used for large, high-power laser systems.

Experience with this technique has shown that large aperture amplifiers, namely the amplifier found at the output of a high power MOPA, are the most cost effective. Therefore, it is desirable to configure a system utilizing only these amplifiers.

The use of a single large aperture amplifier is common in alternative architectures like the multipass and regenerative systems in which a laser beam passes a number of times through the same laser amplifying medium. In these multipass systems, the beam passes through any given part of the gain medium more than once. A regenerative system is a special type of multipass system.

The present invention is concerned with controlled amplification of laser signals. The prior art discloses a number of oscillators using unstable ring laser resonators, such as U.S. Pat. No. 3,824,487 to Buczek, et al.; U.S. Pat. No. 4,135,787 to McLafferty; U.S. Pat. No. 4,239,341 to Cason, III, et al.; and U.S. Pat. No. 4,267,524 to Paxton, et al. All of these patents disclose unstable ring resonator structures having a lasing medium in the cavity. All of these references are concerned with the generation of a laser signal, that is, they disclose oscillators, rather than amplifiers as disclosed by the present invention. These references do not amplify an injected pulse and utilize the entire gain medium in a MOPA configuration.

U.S. Pat. No. 3,942,127 to Fluhr, et al., shows a reflective resonator without spatial filtering which multipasses the gain medium.

U.S. Pat. No. 3,753,147 to Schulthess shows an oscillator/amplifier configuration in which the beam makes only a single pass through the amplifying resonator.

U.S. Pat. No. 4,001,705 to Sinclair, et al., discloses a scanning device for a laser beam. The beam is deflected so as to horizontally and vertically scan a pattern. The system does not utilize an unstable resonator. The beam is not expanded and beam energy in a single pulse is not significantly increased.

U.S. Pat. Nos. 3,508,166 to Simmons, et al; 3,873,942 to Reilly; 4,011,523 to Mansell, et al.; 4,079,340 to Weiner, et al.; 4,126,381 to Chodzko, et al.; 4,190,814 to Van Workum; 4,320,359 to Peterson, et al., show various oscillator designs.

SUMMARY OF THE INVENTION

It is an object of the invention to provide a MOPA architecture system which eliminates many of the preamplifier components and utilizes primarily the power amplifier (final large aperture amplifier).

It is also an object of this invention to successively pass the beam around a ring resonator through different portions of the same amplifying medium on each successive pass.

It is another object of the invention to provide a laser amplifier for high power laser pulses at reduced cost and size.

It is a further object of the invention to provide a ring laser amplifier system in which injection of an input pulse, amplification of that pulse, and extraction of an output pulse is simple and inexpensive.

It is also an object of the invention to provide a laser amplifier system which includes provisions for beam relaying and spatial filtering.

It is another object of the invention to provide a ring laser amplifier system in which energy extraction efficiency and linear aberrations are similar to that obtained from a linear MOPA system architecture.

The invention is a method and apparatus for providing a reflex ring laser system for amplifying an input laser pulse. The invention is particularly useful in laser fusion experiments where efficient production of high-energy and high power laser pulses is required. The invention comprises a large aperture laser amplifier in an unstable ring resonator which includes a combination spatial filter and beam expander having a magnification greater than unity. An input pulse is injected into the resonator, e.g., through an aperture in an input mirror. The injected pulse passes through the amplifier and spatial filter/expander components on each pass around the ring. The unstable resonator is designed to permit only a predetermined number of passes before the amplified pulse exits the resonator. On the first pass through the amplifier, the beam fills only a small central region of the gain medium. On each successive pass, the beam has been expanded to fill the next concentric non-overlapping region of the gain medium. This sequence of passes through the non-overlapping regions of the gain medium is similar to a simple MOPA system in which the individual preamplifier stages have been telescoped into the final amplifier. Each concentric region of the reflex ring amplifier replaces one of the preamplifier stages of the conventional MOPA.

BRIEF DESCRIPTION OF THE DRAWINGS

FIG. 1 is a schematic view of a prior art linear amplifier chain having a master oscillator power amplifier (MOPA) structure.

FIGS. 2(a)-2(d) are representative spatial profiles for the laser pulses at various points in the prior art linear amplifier chain of FIG. 1.

FIGS. 4(a)-4(d) are representative spatial profiles of successive pulses after successive passes through the reflex ring laser amplifier shown in FIG. 3.

DETAILED DESCRIPTION OF THE PREFERRED EMBODIMENTS

Figure 3:
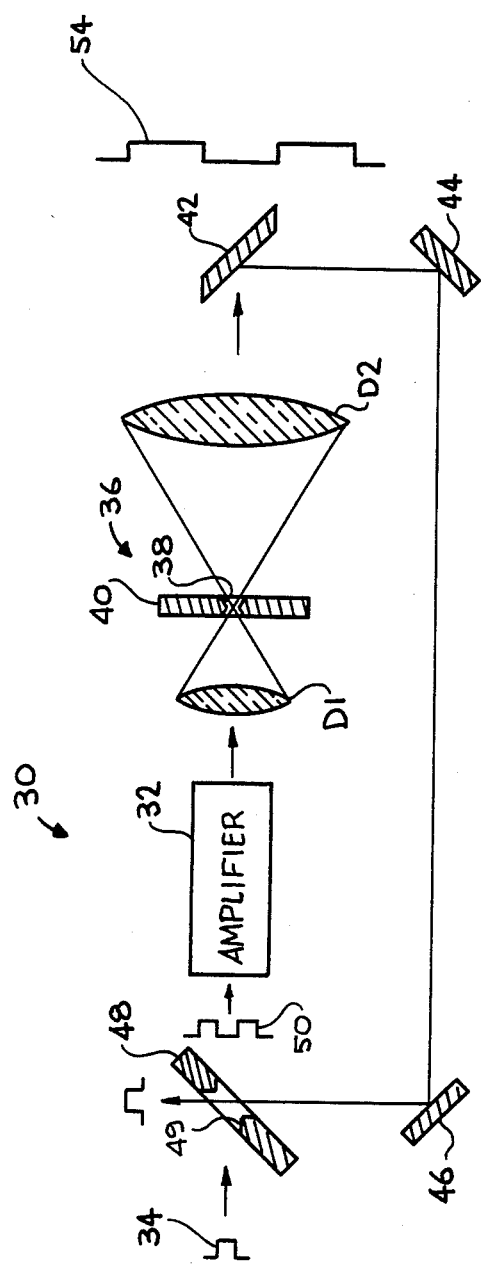
FIG. 3 is a schematic view of a reflex ring laser amplifier system according to the invention.

A conventional prior art master-oscillator power amplifier (MOPA) system 10 is shown schematically in FIG. 1. FIGS. 2(a)-2(d) show the laser beam energy density levels at various points in the system 10. An input pulse 12 from a master-oscillator (not shown) is amplified by a laser amplifier 13 and then spatially filtered and spatially expanded by the spatial filter assembly 14 to produce a first-stage output laser pulse 15 which is then amplified and expanded in a second laser amplifier 16 and a second spatial filter assembly 18 to proouce an output 19 which passes through a third laser amplifier 20 and a third spatial filter assembly 22, to produce an output pulse 24. This illustrative prior art, linear MOPA system is an "isofluent" configuration. The input pulse 12 and output pulse 24, as well as the intermediate pulses 15 and 19, have the same fluence level, that is, the same energy per unit area. FIGS. 2(a)-2(d) show the spatial extent of the amplified pulses, in the direction transverse to the beam path. In each stage of an isofluent MOPA system the input energy density is the same and the output energy density is the same. The spatial filter assemblies between stages are designed so that the magnification (M), the single pass transmission (T) and corresponding gain (G) are matched according to the relationship $G = M^2T$. Thus the energy density at the output of one stage is decreased to the proper value for the input energy density of the next stage so damage thresholds are not exceeded. Of course, a MOPA system is not limited to the isofluent configuration; it may operate under condition where $G \neq M^2T$, particularly $G > M^2T$. For high power systems the amplifiers 13, 16 and 20 may, for example, be neodymium-doped glass discs. Although the illustration utilized three stages, the number of stages can be varied as required.

A reflex ring laser amplifier system 30, according to the invention, is schematically shown in FIG. 3. FIGS. 4(a) through 4(d) show, respectively, laser energy levels versus their spatial distribution after successive passes through the resonator. The reflex ring laser amplifier system 30 includes a large-aperture laser amplifier 32 having an input aperture to which is injected an input laser pulse 34 from a suitable laser pulse source (not shown). Means for spatially expanding the pulse 34 is provided by spatial filter assembly 36 located after the amplifier 32. The spatial filter assembly 36 includes a pinhole aperture 38 formed in a plate 40, a first lens D1 and a second lens D2. The spatial filter 36 has a magnification greater than one and is optically aligned along the axis of the laser amplifier. The pair of lenses D1 and D2 comprise an astronomical telescope. Alternatively, the spatial filter assembly 36 may be positioned in front of the amplifier 32.

Figure 7:
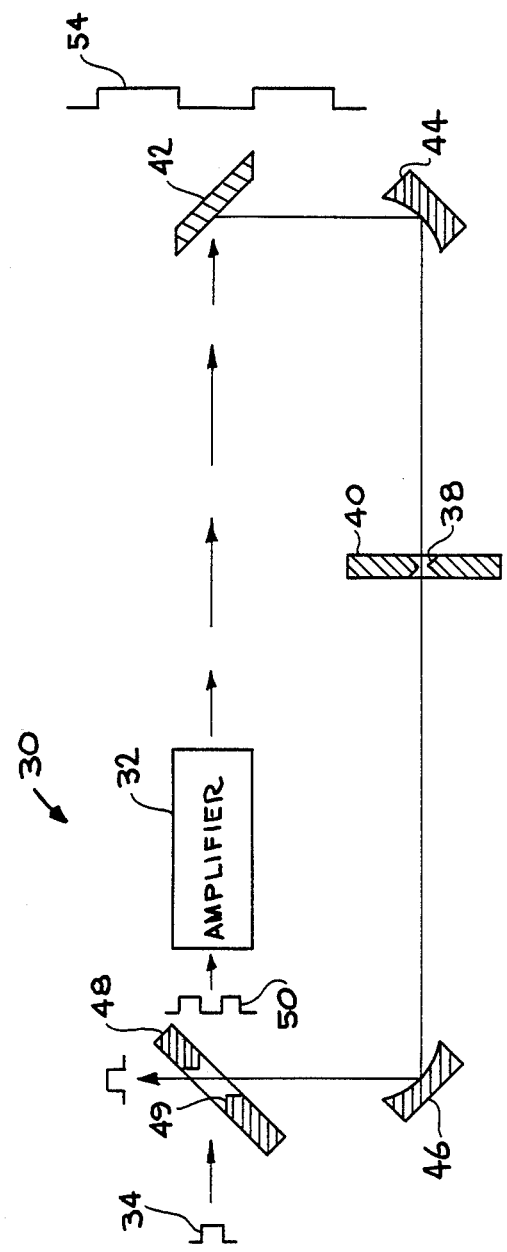
FIG. 7 is a schematic view of an alternate embodiment of a reflex ring amplifier system according to the inventions.

In this particular embodiment of the invention, the means for recirculating an expanded amplified laser pulse back to the input aperture of the laser amplifier 32 includes a plurality of mirrors forming an unstable ring cavity. An output mirror 42, a pair of turning mirrors 44, 46, and an input mirror 48 are arranged to direct the pulse from the output of the amplifier 32 back to the input of the amplifier 32. Typically, four mirrors are sufficient to form the unstable ring cavity, but other mirrors can be used. In the illustrative embodiment the four mirrors are flat. However, in an alternate embodiment, shown in FIG. 7, mirrors 44 and 46 can be focusing mirrors; in this configuration, the plate 40 with pinhole 38 can be placed between the mirrors 44, 46 to provide spatial filtering and the two lenses D1 and D2 are eliminated since beam expansion is provided by the mirrors 44, 46. The beam expansion and spatial filtering is then performed by the mirrors 44, 46 and pinhole 38. The input mirror 48 has an aperture 49 formed along the line of propagation of the input laser pulse 34 which allows the input laser pulse 34 to be injected into the cavity and coupled to the input aperture of the pulse amplifier 32. The mirrors 42, 44, 46 and 48 form a ring resonator structure which provides a path for the laser pulse to make a series of passes around the ring resonator structure until an output pulse exits the cavity. The aperture 49 in the input mirror 48 removes the center portion of the laser pulse on the first pass of the laser pulse around the ring resonator structure such as to produce an annular spatial distribution. While a pulse having cylindrical symmetry is described, the invention is not limited thereto. Other beam cross-sections, such as square beams, may also be produced, as required.

FIG. 4 shows, in cross-section transverse to the beam direction, the spatial profile of the laser pulse as it circulates around the ring laser system 30. FIG. 4(a) shows the input pulse 34. FIG. 4(b) shows the pulse 50 resulting from the input pulse 34 after the first pass through the amplifier 32 and the spatial filter assembly 36 with the center portion removed by aperture 49 in mirror 48. FIG. 4(c) shows the expanded laser pulse 52 produced after the second pass around the ring structure through the amplifier 32 and the spatial filter assembly 36. The laser pulse exits the system 30 when the pulse has reached a predetermined spatial extent. One particular preferred embodiment of this output coupling means includes having the dimensions of the output mirror 42 such that the laser pulse, when it reaches a predetermined spatial extent passes around the output mirror 42 and exits the laser amplifier system 30. FIG. 4(d) shows the output laser pulse 54. The spatial width of the pulse 54 is such that the lateral part of the pulse passes around the edges of the output mirror 42 and is coupled out of the laser amplifier system 30 as indicated in FIG. 3. The optics can be designed so that the annular pulse is completely contained by output mirror 42 on the pass before extraction and the annular output pulse completely extends outside mirror 42 so no energy is lost. The invention is illustrated in a system in which the pulse is extracted on the fourth pass through the resonator, but this can be varied as required. Typically, a reflex ring according to the invention will utilize three to four passes. The illustrative embodiment is also an isofluent configuration, i.e., the case where the magnification, single pass transmission and gain are related as $G = M^2T$. However, alternate embodiments of the invention need not be isofluent. The case $G > M^2T$ may be preferred in which the fluence level increases on successive passes; the case $G < M^2T$ may also be utilized but is not as likely.

Figure 5:
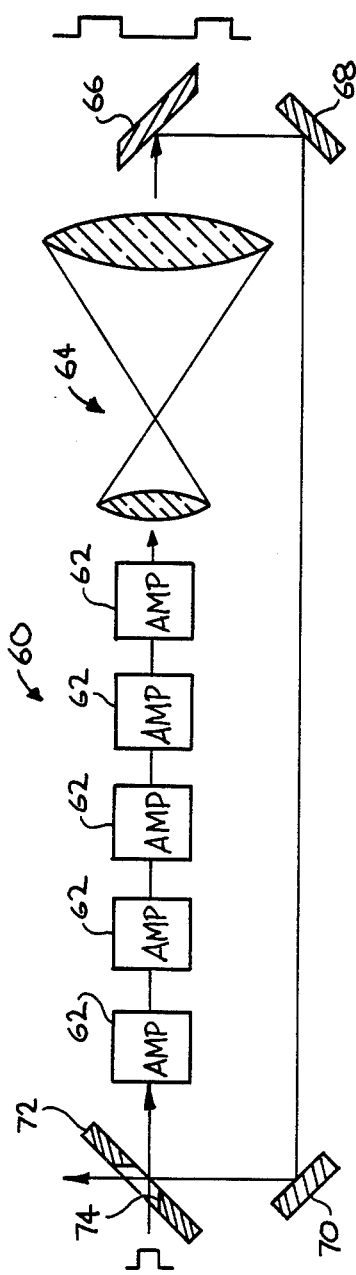
FIG. 5 is a schematic view of a reflex ring laser amplifier system incorporating cascaded laser amplifiers.

FIG. 5 is an embodiment of the invention, a system 60, which includes five cascaded laser amplifiers 62. The cascaded amplifiers 62 are followed by spatial filter 64. A ring structure is provided by an output mirror 66, a pair of turning mirrors 68, 70 and an input mirror 72 having an input aperture 74 formed therein.

Figure 6:
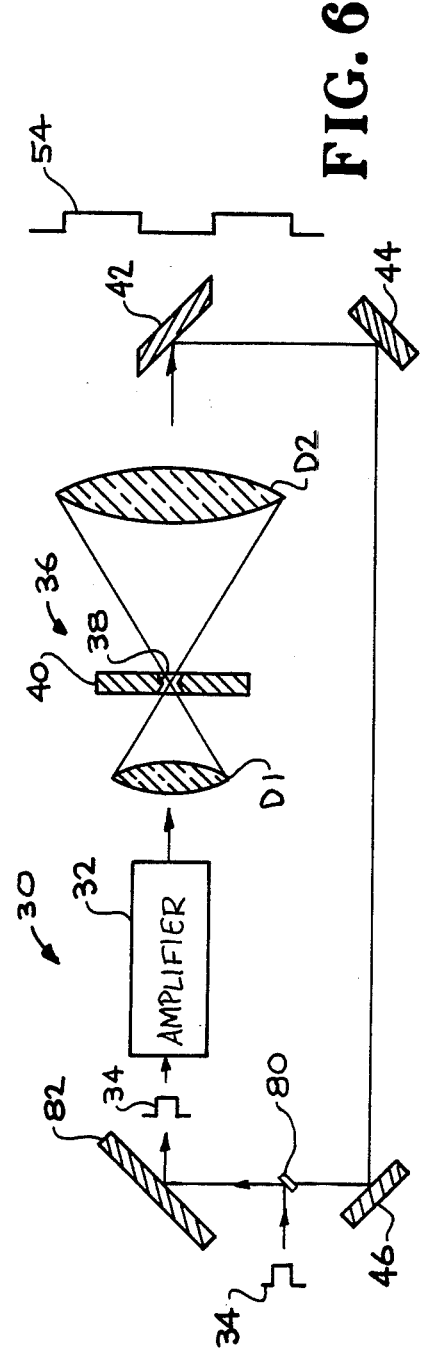
FIG. 6 is a schematic view of a laser amplifier system using a small auxiliary mirror for alternative embodiment of the reflex ring for coupling an input laser pulse into the resonator.

FIG. 6 shows an alternative scheme for coupling an input pulse in to the laser amplifier system 30 of FIG. 3. An input pulse 34 is reflected from a small auxiliary mirror 80 which is placed in the reflex ring beam path.

A mirror 82 is substituted for input mirror 48 to reflect the input pulse 34 into the amplifier 32. The remainder of the system is identical to that shown in FIG. 3 and an amplified expanded pulse is reflected from the turning mirror 46, as shown in FIG. 6. A portion of that pulse is intercepted by the auxiliary mirror 80 and is lost. This is like the system of FIG. 3 where the aperture 49 in mirror 48 allows some laser energy to escape. The remainder of the laser energy passes around the auxiliary mirror 80, is relfected from the mirror 82, and is recirculated through the amplifier 32. The dimensions of mirror 80 are small enough that the amplified annular beam produced passes by mirror 80 on successive passes.

Changes and modifications in the specifically described embodiments can be carried out without departing from the scope of the invention which is intended to be limited only by the scope of the appended claims.

I claim:

1. An unstable ring resonator laser amplifier system for amplifying an input laser pulse, comprising:
   a large-aperture laser amplifier having an input aperture to which the input laser pulse is injected for amplification by said laser amplifier and having an output aperture at which an amplified laser pulse is produced;
   means, optically aligned with the amplifier, for spatially filtering and expanding the laser pulse;
   means for recirculating the laser pulse through the amplifier to produce an expanded amplified laser pulse, successive pulses passing through concentric non-overlapping regions of the gain medium on each successive pass;
   means for coupling the expanded amplified laser pulse out of the unstable resonator when the laser pulse has reached a predetermined spatial extent.

2. The laser amplifier system of claim 1 wherein the means for spatially filtering and expanding the laser pulse is positioned after the amplifier.

3. The laser amplifier system of claim 1 wherein the means for spatially filtering and expanding the laser pulse is positioned before the amplifier.

4. The laser amplifier system of claim 1 wherein the means for recirculating the expanded amplified laser pulse comprises a plurality of mirrors forming a ring resonator.

5. The laser amplifier of claim 4 wherein the number of mirrors is four.

6. The laser amplifier of claim 4 wherein the mirrors are optically flat.

7. The laser amplifier of claim 4 wherein a pair of adjacent mirrors are focusing mirrors which spatially expand the pulse.

8. The laser amplifier of claim 7 further including a pinhole at the focal point between the pair of focusing mirrors for spatially filtering the pulse.

9. The laser amplifier of claim 1 wherein the means for spatially filtering and expanding the pulse comprises a pair of lenses forming an astronomical telescope and a pinhole at the focal point between the pair of lenses.

10. The laser amplifier system of claim 1 wherein the means for recirculating the expanded laser pulse includes an input mirror having an aperture formed therein to permit the input laser pulse to enter the unstable ring resonator and to remove the central portion of the expanded beam on the first pass.

11. The laser amplifier system of claim 1 further including an auxiliary mirror to permit the input laser pulse to be coupled into the unstable ring resonator and to remove the central portion of the expanded beam on the first pass.

12. The laser amplifier system of claim 1 wherein the means for coupling out the expanded, amplified and filtered laser pulse comprises an output mirror having dimensions such that the laser pulse, when it reaches a predetermined spatial extent, passes around the output mirror and exits the unstable ring resonator.

13. The laser amplifier system of claim 1 wherein the large aperture laser amplifier comprises a plurality of cascaded amplifiers.

14. The laser amplifier of claim 1 wherein the means for spatially filtering and expanding the beam has a magnification greater than one.

15. The laser amplifier of claim 1 wherein the gain (G) of the amplifier, the transmission (T) of the ring resonator and the magnification (M) of the means for expanding the pulse satisfy the condition for isofluence $G = M^2 T$ whereby a pulse has substantially the same fluence (energy density) on the components for each pass.

16. The laser amplifier of claim 1 where the gain (G) of the amplifier, the single pass transmission (T) of the ring resonator and the magnification (M) of the means for expanding the pulse satisfy the condition $G > M^2 T$.

17. The laser amplifier of claim 1 where the gain (G) of the amplifier, the single pass transmission (T) of the ring resonator and the magnification (M) of the means for expanding the pulse satisfy the condition $G < M^2 T$.

18. An unstable ring resonator laser amplifier system comprising:
   a large-aperture laser amplifier having input and output apertures;
   a beam expanding spatial filter with magnification greater than 1 coupled to the output aperture of the laser amplifier and optically aligned with the laser amplifier;
   a plurality of mirrors forming a ring structure for the laser amplifier and spatial filter, the plurality of mirrors including an input mirror having a small aperture formed therein for injection of an input laser pulse into the unstable ring resonator, said plurality of mirrors providing a path for the laser pulse to make a series of passes around the ring structure and increase in spatial extent, the expanding pulse passing through different concentric non-overlapping regions of the amplifier on each pass the plurality of mirrors also including an output mirror having dimensions such that on the final pass through the ring structure the laser pulse passes around the output mirror and exits the ring resonator structure.

19. A method of amplifying an input laser pulse, comprising the steps of:
   injecting an input laser pulse into an unstable ring resonator;
   amplifying the input laser pulse in the resonator;
   spatially filtering the amplified pulse in the resonator;
   expanding the amplified and filtered pulse in the resonator;
   recirculating the expanded, amplified pulse around the ring resonator;
   coupling out the expanded, amplified and filtered pulse when the recirculating pulse has reached a predetermined spatial extent.

20. The method of claim 19 wherein the steps of injecting a laser pulse into the unstable ring resonator includes injecting the laser pulse through an aperture formed in a mirror used for recirculating the amplified, expanded laser pulse.

21. The method of claim 19 wherein the step of coupling out the expanded, amplified pulse includes passing the pulse around an output mirror used for recirculating the expanded pulse.

22. The method of claim 19 wherein the recirculating pulse is amplified by passing through concentric non-overlapping regions of gain medium in an amplifier on each successive pass around the ring resonator.

* * * * *